US012210677B2

(12) United States Patent
Ajagbusi et al.

(10) Patent No.: US 12,210,677 B2
(45) Date of Patent: Jan. 28, 2025

(54) GAZE-BASED ACTIVE DEVICE IDENTIFICATION AND MANAGEMENT

(71) Applicant: INTERNATIONAL BUSINESS MACHINES CORPORATION, Armonk, NY (US)

(72) Inventors: Daniel Ajagbusi, Brooklyn Park, MN (US); Edna Tovar, Austin, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 18/313,683

(22) Filed: May 8, 2023

(65) Prior Publication Data
US 2024/0377882 A1 Nov. 14, 2024

(51) Int. Cl.
*G06F 3/01* (2006.01)
*G06T 17/00* (2006.01)
*G06V 10/44* (2022.01)
*G06V 10/74* (2022.01)
*G06V 10/75* (2022.01)

(52) U.S. Cl.
CPC .............. *G06F 3/013* (2013.01); *G06T 17/00* (2013.01); *G06V 10/44* (2022.01); *G06V 10/751* (2022.01); *G06V 10/761* (2022.01)

(58) Field of Classification Search
CPC .... G06F 3/013; G06V 10/761; G06V 10/751; G06V 10/44; G06T 17/00
USPC .......................................................... 348/78
See application file for complete search history.

(56) References Cited

U.S. PATENT DOCUMENTS

| 10,136,214 | B2 | 11/2018 | Smus | |
|---|---|---|---|---|
| 10,452,134 | B2 | 10/2019 | Baca | |
| 10,845,871 | B2 * | 11/2020 | Parker | G06F 3/04842 |
| 11,216,065 | B2 | 1/2022 | Vanblon | |
| 2015/0130685 | A1 * | 5/2015 | Kim | G06F 3/147 345/3.1 |
| 2016/0378179 | A1 * | 12/2016 | Baca | G06F 3/013 345/156 |
| 2017/0048613 | A1 * | 2/2017 | Smus | H04L 65/1069 |
| 2017/0351329 | A1 * | 12/2017 | Picard | G06V 10/44 |
| 2018/0101989 | A1 * | 4/2018 | Frueh | G06T 19/20 |
| 2021/0325960 | A1 * | 10/2021 | Iglesias | G06F 3/0484 |
| 2021/0366440 | A1 * | 11/2021 | Burns | G06F 3/038 |

(Continued)

FOREIGN PATENT DOCUMENTS

WO 2023285109 A1 1/2023

OTHER PUBLICATIONS

"Eye control basics in Windows," printed from the internet Apr. 12, 2023, 10 pages.

(Continued)

*Primary Examiner* — Matthew David Kim
(74) *Attorney, Agent, or Firm* — James L. Olsen

(57) ABSTRACT

Aspects of the present disclosure relate to gaze-based active device identification and management. At a first time, at least one reference gaze image of a user while the user is gazing at a first user device of a plurality of user devices in an environment of the user can be collected. At a second time, a current gaze image of the user can be collected. The at least one reference gaze image can be compared with the current gaze image to determine that the user is gazing at the first user device of the plurality of user devices.

20 Claims, 7 Drawing Sheets

(56) References Cited

U.S. PATENT DOCUMENTS

| | | | |
|---|---|---|---|
| 2022/0147141 A1 | 5/2022 | Gustafsson | |
| 2022/0148218 A1* | 5/2022 | Weitz | G06V 10/761 |
| 2022/0155861 A1* | 5/2022 | Myung | G06T 19/006 |
| 2022/0207667 A1* | 6/2022 | Huang | G06V 40/171 |
| 2023/0176648 A1* | 6/2023 | Dahlgren | G06F 3/14 |
| | | | 345/156 |
| 2023/0308505 A1* | 9/2023 | Sharma | G06F 3/017 |

OTHER PUBLICATIONS

"GazePointer," printed from the internet Apr. 12, 2023, 3 pages.

Screen captures from YouTube clip entitled "How to use eye control on a PC running Windows 10|Microsoft," uploaded on May 22, 208 by Microsoft Helps, 6 pages. https://www.youtube.com/watch?v=4Bqs9JkMcCA.

"Mouse Without Borders—Microsoft Garage," printed from the internet Apr. 12, 2023, 4 pages.

"The Master Series by Logitech," printed from the internet Apr. 12, 2023. 10 pages.

"Universal Control: Use a single keyboard and mouse between Mac and iPad," printed from the internet Apr. 12, 2023, 7 pages.

Fono et al., EyeWindows: Evaluation of Eye-Controlled Zooming Windows for Focus Selection, CHI 2005, Apr. 2-7, 2005, pp. 151-160, Portland Oregon.

Kaufman et al., "An Eye Tracking Computer Interface," IEEExplore, 1993, pp. 121-122, Computer Science Department State University of New York at Stony Brook, NY.

Khamis et al., "EyeScout: Active Eye Tracking for Position and Movement Independent Gaze Interaction with Large Public Displays," UIST 2017, Oct. 22-25, 2017, pp. 155-166.

* cited by examiner

GAZE-BASED ACTIVE DEVICE IDENTIFICATION AND MANAGEMENT

BACKGROUND

The present disclosure relates generally to the field of computing, and in particular, to gaze-based active device identification and management.

The number of devices accessible by users is increasing over time. For example, a user may have access to a laptop computer, a desktop computer, a wearable device, a mobile device, an extended reality (XR) device, and/or other devices in their environment. In certain situations, the user may desire to perform tasks on each of the devices within a relatively short time period. For example, at a first time, a user may perform tasks on a first device, at a second time (e.g., 5 minutes later), the user may perform tasks on a second device, and at a third time (e.g., a minute later), the user may perform tasks on a third device. It is common for users to switch between devices within relatively short periods of time.

Peripheral devices (e.g., peripherals) are hardware devices that are used to transmit information into and out of computers (e.g., user devices). Example input peripheral devices include mice, keyboards, scanners, readers, controllers, electronic pens, microphones, and cameras (e.g., webcams). Example output peripheral devices include monitors, projectors, printers, headphones, and speakers. Peripheral devices can also include input/output functions. Such devices include storage devices (e.g., flash drives, memory cards, tape drives), modems, and network interfaces.

SUMMARY

Aspects of the present disclosure relate to a computer program product, system, and method for gaze-based active device identification and management. At a first time, at least one reference gaze image of a user while the user is gazing at a first user device of a plurality of user devices in an environment of the user can be collected. At a second time, a current gaze image of the user can be collected. The at least one reference gaze image can be compared with the current gaze image to determine that the user is gazing at the first user device of the plurality of user devices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
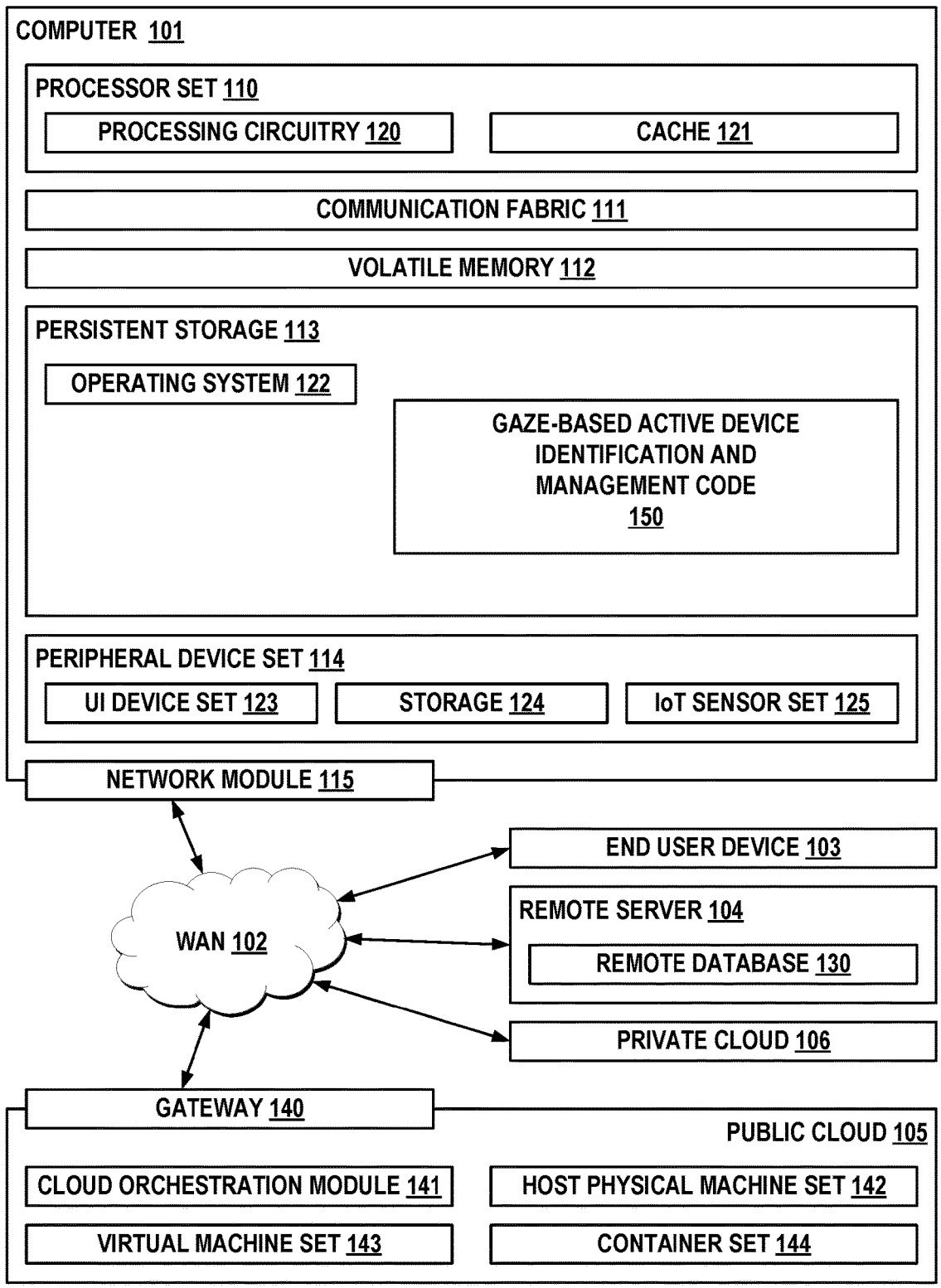
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to gaze-based active device identification and management. While the present disclosure is not necessarily limited to such applications, various aspects of the disclosure may be appreciated through a discussion of various examples using this context.

As discussed above, the number of devices accessible by users is increasing over time. For example, a user may have access to a laptop computer, a desktop computer, a wearable device, a mobile device, an extended reality (XR) device, and/or other devices in their environment. In certain situations, the user may desire to perform tasks on each of the devices within a relatively short time period. For example, at a first time, a user may perform tasks on a first device, at a second time (e.g., 5 minutes later), the user may perform tasks on a second device, and at a third time (e.g., a minute later), the user may perform tasks on a third device. It is common for users to switch between devices within relatively short periods of time.

As also discussed above, peripheral devices are hardware devices that are used to transmit information into and out of computers. Example input peripheral devices include mice, keyboards, scanners, readers, controllers, electronic pens, microphones, and cameras. Example output peripheral devices include monitors, projectors, printers, headphones, and speakers. Peripheral devices can also include both input/output functions. Such devices include storage devices, modems, and network interfaces.

Because users may routinely switch between devices within their vicinity, it can be tedious to manage commands (e.g., executable software functions) transmitted to and/or peripherals paired with such devices. For example, a user may be required to manually manage commands transmitted to devices they are switching between and/or to manage peripherals paired with devices they are switching between. As an example, if a particular file is open on a first device, the user may be required to manually open the file on a second device as they switch devices. As another example, a user may only have limited peripherals for providing inputs to the devices and/or for handling outputs from the devices in their environment. In this example, the user may be required to manually reconnect (e.g., wirelessly pair) peripherals to a new device they switch to. Improvements are needed for management of commands provided to and/or peripherals paired with a plurality of devices within an environment of a user.

Aspects of the present disclosure relate to gaze-based active device identification and management. At a first time, at least one reference gaze image of a user while the user is gazing at a first user device of a plurality of user devices in an environment of the user can be collected. At a second time, a current gaze image of the user can be collected. The at least one reference gaze image can be compared with the current gaze image to determine that the user is gazing at the first user device of the plurality of user devices. In embodiments, the user device that the user is determined to be gazing (e.g., the identified active user device) can be managed via one or more commands and/or pairing with one or more peripherals.

Aspects of the present disclosure provide various improvements. By dynamically identifying an active device the user is gazing, commands and/or peripherals can be automatically managed for the active device without requiring manual intervention from the user. Additionally, active device identification can be completed using devices within the user's environment without requiring specialized hardware (e.g., specialized eye-tracking devices or other head-mounted displays that capture/track eye movements). Further still, aspects can enable the user to customize the functionality of active device identification, allowing the user to specify various parameters which can be enabled by the system including, but not limited to, setting particular commands to be issued to particular user devices using gaze-based active device identification, setting particular peripherals to be paired with particular user devices using gaze-based active device identification, defining user devices to be managed via gaze-based active device identification, defining peripheral devices to be managed via gaze-based active device identification, setting reference gaze image collection conditions, setting current gaze image collection conditions, and/or setting comparison methods for comparing reference gaze images and current gaze images, among other configuration settings.

Ultimately, aspects of the present disclosure improve the technical field of gaze tracking and device management by improving the accuracy of gaze identification, providing automated manners for control, improving usability of gaze identification systems, and improving the speed at which gaze identification can be completed (e.g., which is only limited based on the speed of image collection and comparison, and not eye-tracking analysis).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as gaze-based active device identification and management code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and gaze-based active device identification and management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in gaze-based active device identification and management code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in gaze-based active device identification and management code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
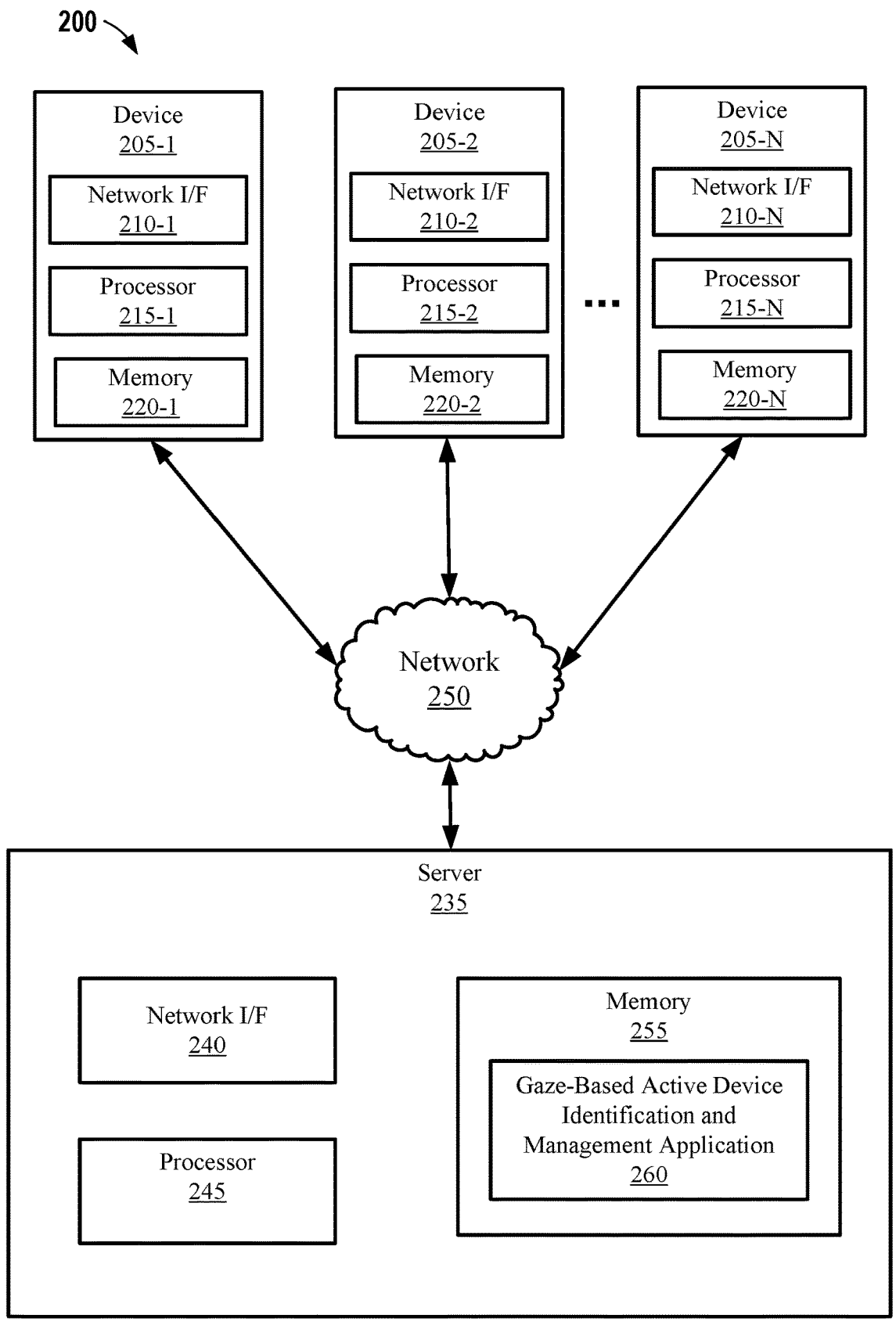
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2, . . . , 205-N (collectively devices 205), at least one server 235, and a network 250.

The devices 205 and the server 235 include one or more processors 215-1, 215-2, . . . , 215-N (collectively processors 215) and 245 and one or more memories 220-1, 220-2, . . . , 220-N (collectively memories 220) and 255, respectively. The processors 215 and 245 can be the same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2, . . . , 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can be, or include, components/devices such as those described with respect to peripheral device set 114 of FIG. 1. The devices 205 and/or the server 235 can be servers, desktops, laptops, or hand-held devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a gaze-based active device identification and management application (GADIMA) 260. The GADIMA 260 can be configured to automatically manage commands issued to, and/or peripherals paired with, user devices (e.g., devices 205) in an environment of a user based on gaze image data collected from the user. In particular, the GADIMA 260 can be configured to determine an active device of a plurality of devices in the user's environment that the user is gazing based on the gaze image data, and responsively, transmit one or more commands to the active device and/or pair one or more peripherals with the active device.

As referenced herein, an "active device" refers to a device which is identified as a device that a user is actively gazing. The "active device" does not necessarily have to be powered on or otherwise in-use. As referenced herein, "gaze" or "gazing" a device refers to a user looking at, viewing, or otherwise focusing their eyes/posture on an active device. A user looking at or viewing a device can be considered at gaze for any suitable time period (e.g., a momentary glance versus a fixed stare).

The GADIMA 260 can be configured to identify user devices in an environment (e.g., a nearby vicinity, within a given area, within a given geofence, on a same wireless network, etc.) of a user. Any suitable number and/or type of devices can be implemented. The user devices can be the same as, or substantially similar to, end user device 103 and/or peripheral device set 114 described with respect to FIG. 1. In embodiments, identified user devices can include devices that are powered on within the environment of the user. In embodiments, identified user devices can include devices that the user has interacted with within a particular time window (e.g., within the last 5 minutes, 15 minutes, hour, etc.). In embodiments, identified user devices can include devices that are manually indicated (e.g., on a graphical user interface (GUI) or other input mechanism) by the user. In embodiments, identified user devices can include devices that are connected to a same wireless network (e.g., a same router or modem). In these embodiments, the GADIMA 260 can be configured to identify the user devices based on devices indicated as connected to the same wireless network. However, any other suitable manner for identifying user devices in the environment of the user to be managed by GADIMA 260 can be implemented without departing from the spirit and scope of the present disclosure.

In embodiments, the GADIMA 260 can be configured to identify peripheral devices in the environment of the user that can be utilized for gaze-based pairing. The peripheral devices can be the same as, or substantially similar to, peripheral device set 114 of FIG. 1. In embodiments, the peripheral devices to be managed by the GADIMA 260 can be manually designated by the user. In embodiments, the peripheral devices to be managed by the GADIMA 260 can include all peripherals paired to a particular device (e.g., a first device) or set of devices (e.g., a first and second device) within the environment of the user. However, any suitable number and/or type of peripheral devices can be implemented and managed by GADIMA 260. The peripheral devices can include wireless pairing functionalities such that gaze-based automatic pairing can be completed without requiring user intervention.

The GADIMA 260 can be configured to collect reference gaze image data from the user. Collecting reference gaze image data from the user can include capturing one or more images of the user while the user is gazing at one or more respective user devices in their environment at a particular time (e.g., a first time). The reference gaze images serve as a reference for how the user appears when the user is gazing each of the respective devices. For example, a first reference image can be captured by a first user device depicting how the user appears when the user is gazing at the first user device, a second reference image can be captured by a second user device depicting how the user appears when the user is gazing at the second user device, and a third reference image can be captured by a third user device depicting how the user appears when the user is gazing at the third user device. Thus, each user device in the environment of the user can be configured to collect reference image data depicting the appearance of the user when the user is gazing at each respective user device. Alternatively or additionally, reference gaze images of the user can be collected when the user is looking at a different device than the device that captured the reference image. For example, a first reference image can be captured by a second user device depicting how the user appears when the user is gazing at a first user device, a second reference image can be captured by a third user device depicting how the user appears when the user is gazing at the first user device, and a third reference image can be captured by a fourth user device depicting how the user appears when the user is gazing at the first user device. Thus, the user devices can be configured to capture the user's appearance when the user is gazing at devices within the environment.

Collection of reference gaze image data by GADIMA 260 can occur in response to a condition. For example, in some embodiments, collection of reference gaze image data can be initiated in response to a manual indication by the user. In these embodiments, the user can initiate the reference gaze image collection via a command (e.g., a voice command, touch command, GUI command, etc.) to initiate a reference gaze image collection session (a calibration session or set-up session). In some embodiments, the collection of reference gaze image data can be initiated in response to a determination that reference gaze images do not match a current gaze image of the user (to be discussed with respect to FIG. 6). In some embodiments, collection of reference image data can be initiated in response to a determination that one or more user devices in the environment of the user being managed by GADIMA 260 have been repositioned (to be discussed further with respect to FIG. 7). In embodiments, collection of reference gaze image data can be completed continuously (e.g., via live active video feeds), periodically (e.g., every minute, every 5 minutes, every hour, etc.), intermittently, or at any other suitable time interval or condition.

In embodiments, upon collecting reference gaze image data, the GADIMA 260 can be configured to generate a virtual layout indicating spatial locations (e.g., position and orientation) of each user device in the environment of the user. The virtual layout can be a digital representation of the environment of the user indicating the position/orientation of each user device and/or the position/orientation of the user at the time the reference gaze images were collected. The virtual layout can be utilized by the user to manually indicate which user devices they desire to be managed by the GADIMA 260. Further the virtual layout can be utilized by the user such that the user can indicate position changes of any user devices captured within the virtual layout. In embodiments, the virtual layout can be used to generate an extended reality (XR) representation of the environment such that the user can manage the virtual layout via an XR device (e.g., a virtual reality (VR) or augmented reality (AR) device). Thus, in embodiments, the virtual layout can be rendered to the user in 2-dimensions (e.g., on a 2D display) or in 3-dimensions (e.g., within VR).

The GADIMA 260 can be configured to collect a current gaze image of the user at a current time (e.g., a second time). The current gaze image can be collected by any suitable user device within the environment of the user. In embodiments, the current gaze image is collected from a user device that has already captured a reference gaze image such that comparison between the current gaze image and the reference gaze image can be completed. The current gaze image can be collected at any suitable condition or timing. In embodiments, the current gaze image can be collected in response to a manual indication by the user. In embodiments, the current gaze image can be collected continuously (e.g., via a live active video feed), periodically (e.g., every minute, 5 minutes, 30 minutes, etc.), or intermittently. In embodiments, the current gaze image can be collected when a determination is made that the user has changed position (e.g., via a camera, gyroscope, accelerometer, or other sensor). The current gaze image can capture the user's appearance when the user is gazing at a particular device at the current time. The current gaze image can be compared to the reference gaze images such that a user device that the user is determined to be gazing can be determined (i.e., such that an active device the user is gazing can be identified). In embodiments, multiple current gaze images can be simultaneously collected from multiple devices such that multiple angles of comparison can be completed (e.g., between corresponding reference gaze images), thereby increasing the accuracy of active device identification.

The GADIMA 260 can be configured to compare the current gaze image of the user with one or more of the reference gaze images to determine which user device the user is currently gazing. Comparing the current gaze image with one or more reference gaze images can include techniques for image comparison. For example, pixels of the current gaze image can be compared with pixels of the reference gaze image that current gaze image is currently being compared to. As another example, features of the current gaze image (e.g., ridges, blobs, edges, objects, facial features, curves, etc.) can be compared with features of the reference gaze image(s). Image comparison can utilize one or more machine learning (ML) and/or artificial intelligence (AI) techniques. The comparison can utilize one or more techniques for image differencing. In embodiments, pre-processing of the current gaze image and/or the reference gaze images can be completed such that adequate comparison can be completed. For example, pre-processing images for comparison can include aligning particular portions of the images, rotation of images, color-mapping, noise reduction, filtering, feature extraction, and/or other pre-processing techniques. Comparison can be completed on a pixel-basis or feature-basis. In embodiments, multiple current gaze images can be compared with multiple reference gaze images such that multiple angles of comparison can be completed, which can improve accuracy of active device identification.

Upon comparing the reference gaze image(s) with the current gaze image(s), a determination is made whether the user is gazing at a user device, and if so, which user device the user is gazing. In embodiments, if a determination is made that the user is not gazing at a user device, then re-collection of reference gaze images can be completed, as this may indicate that one or more user devices have been repositioned within the user's environment.

In embodiments, if a determination is made that the user is gazing at a particular device (e.g., an active device the user is gazing is identified), then one or more commands can be automatically issued to the particular device and/or one or more peripherals can be paired with the particular device. Commands that can be issued to the active device that is identified can include power-on commands, reboot commands (e.g., restart commands), launching one or more software features (e.g., files or applications), closing one or more software features, memory actions (e.g., deleting, backing-up, transferring, duplicating, or installing/storing data on the active device), and other commands/executable software functions.

Pairing peripherals with the identified active user device can include short-range wireless protocols, including near-field communication (NFC), radio frequency identification (RFID), ZIGBEE®, BLUETOOTH®, WI-FI®, WI-FI DIRECT®, and the like. Pairing can include disconnecting the peripheral from a device the user is not gazing and connecting the peripheral device to the device the user is gazing. For example, a mouse, keyboard, monitor, printer, or other peripheral can be automatically wirelessly paired with the identified active device.

In embodiments where a single user device has multiple displays or screens, reference images can be captured when the user is gazing at each display of the device. For the purposes of determining that a user is gazing at a user device with multiple displays, if a determination is made that the user is gazing at any display of the device, then a determination can be made that the user is gazing at the user device.

Upon issuing commands (e.g., executing one or more software functions) and/or pairing peripheral(s) with the user device the user is determined to be gazing, the GAD-IMA 260 can be configured to continue to monitor the environment of the user to determine whether to automatically issue commands to another device and/or pair peripherals with another device (e.g., via current gaze image collection and comparison to reference gaze images). Monitoring the gaze of the user can also continue to be completed to determine whether to re-collect reference gaze images (e.g., if one or more user devices are repositioned within the environment).

In embodiments, particular commands to issue to particular devices within the user's environment can be preconfigured. That is, a user can designate, on a GUI or other input mechanism, the type of commands (e.g., power-on, launch software, update, back-up, etc.) they desire to be automatically executed in response to gaze-based active device identification. For example, for a first device, a user can indicate that a first software application should be launched whenever the first device is identified as the active device via gaze analysis (e.g., reference gaze image comparison to a current gaze image). As another example, for a second device, the user can indicate that the second device should be powered-on or otherwise activated if the second device is in an inactive state (e.g., idle, off, in sleep mode, etc.) when the second device is identified as the active device via gaze analysis. As another example, a user can designate a first set of peripherals that should be paired to a third device in response to determining that the third device is identified as the active device via gaze analysis. As another example, the user can designate a second set of peripherals that should be paired to a fourth device in response to determining that the fourth device is identified as the active device via gaze analysis. Any suitable number and/or type of commands can be issued to devices within the user's environment based on gaze-based active device identification. Further, any suitable number and/or type of peripherals can be paired with devices within the user's environment based on gaze-based active device identification.

It is noted that FIG. 2 is intended to depict the representative major components of an example computing environment 200. In some embodiments, however, individual components can have greater or lesser complexity than as represented in FIG. 2, components other than, or in addition to, those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., gaze image data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
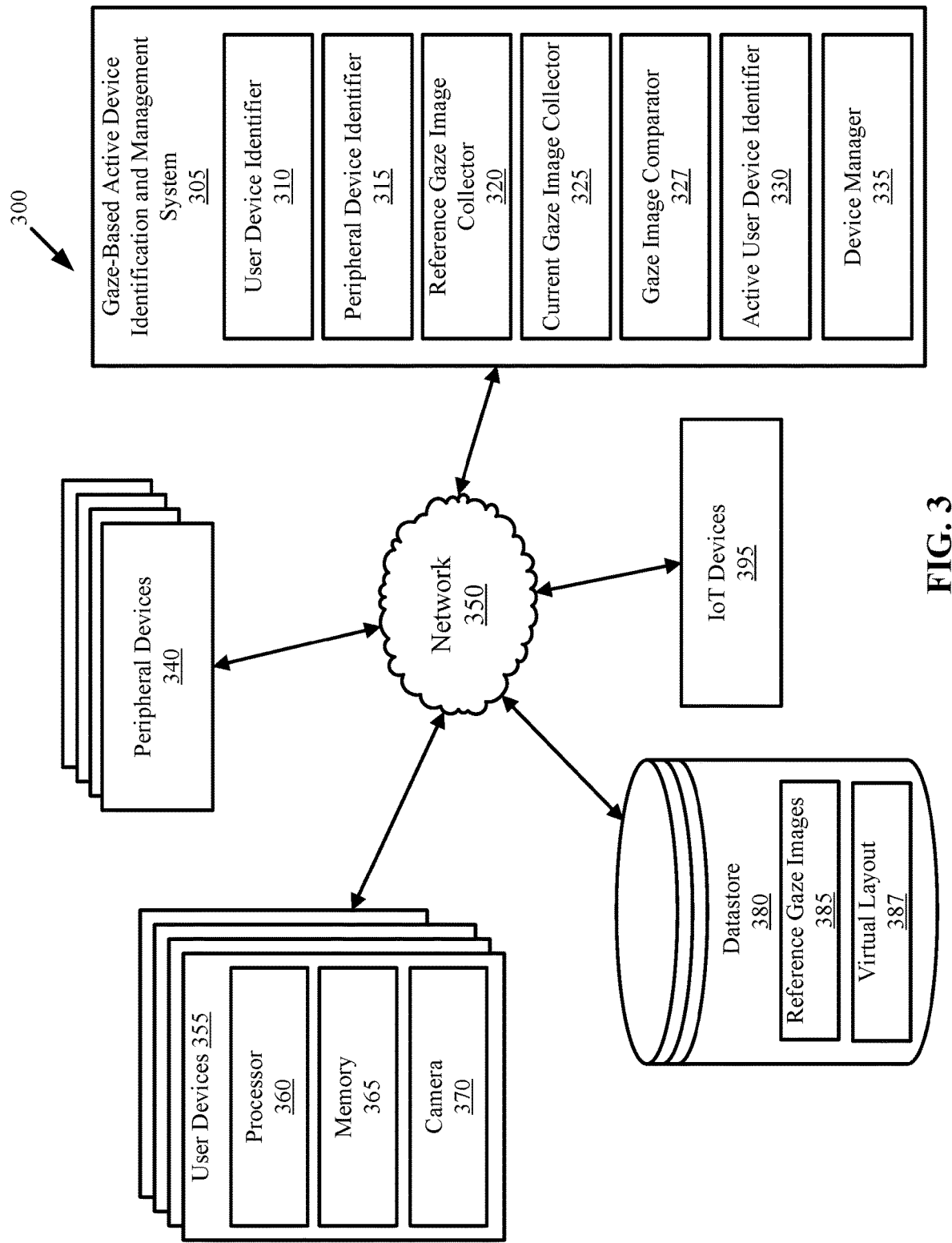
FIG. 3 is a block diagram illustrating an example network environment including a gaze-based active device identification and management system, in accordance with embodiments of the present disclosure.

Referring now to FIG. 3, shown is a block diagram illustrating an example network environment 300 in which illustrative embodiments of the present disclosure can be implemented. The network environment 300 includes a gaze-based active device identification and management system (GADIMS) 305, user devices 355, peripheral devices 340, IoT devices 395, and a datastore 380, each of which can be communicatively coupled for intercomponent interaction via a network 350. In embodiments, the network 350 can be the same as, or substantially similar to, network 250 and/or WAN 102. In embodiments, the user devices 355, peripheral devices 340, IoT devices 395, and GADIMS 305 can be the same as, or substantially similar to, computer 101, peripheral device set 114, end user device 103, devices 205, and/or server 235.

The GADIMS 305 can be configured to manage commands (e.g., software functions) issued to and/or peripheral devices 340 paired with user devices 355 using gaze-based active device identification. In particular, the GADIMS 305 can be configured to facilitate gaze-based analysis via reference gaze image collection and comparison to current gaze image data to identify an active device the user is currently gazing. The active device the user is determined to be currently gazing can then be managed by the GADIMS 305 via issuance of one or more commands and/or pairing with one or more peripheral devices 340.

The user devices 355 each include a processor 360, a memory 365, and a camera 370. The user devices 355 can include any devices described with respect to FIGS. 1-2. For example, user devices 355 can include wearable devices, tablets, laptops, desktop computers, XR devices, gaming devices, financial terminals, and mobile devices (e.g., smart phones), among others. The user devices 355 can be managed by GADIMS 305 via active device identification and management functionalities. In embodiments, user devices 355 do not necessarily require a camera 370, as cameras of proximate user devices 355 and/or IoT devices 395 can be utilized for reference gaze image collection and current gaze image collection. For example, a first user device can capture reference gaze images and current gaze images of a user gazing at a second user device, where the second user device does not include a camera. In this example, determining that the user is gazing at the second user device can be completed using images collected by a camera of the first user device.

In embodiments, the user devices 355 can enable the user to interface (e.g., control, manage, view, etc.) the GADIMS 305. For example, an application (e.g., GADIMA 260) which allows the user to change configuration settings of functionalities of the GADIMS 305 can be installed on a user device 355. This can allow the user to set particular commands to be issued to particular user devices 355 using gaze-based active device identification, set particular peripheral devices 340 to be paired with particular user devices 355 using gaze-based active device identification, define user devices 355 to be managed by GADIMS 305, define peripheral devices 340 to be managed by GADIMS 305, set reference gaze image collection conditions, set current gaze image collection conditions, and/or set comparison methods for comparing reference gaze images and current gaze images, among other configuration settings.

The peripherals devices 340 can include any peripheral devices described with respect to FIGS. 1-2. For example, peripherals can include mice, keyboards, printers, monitors, speakers, scanners, plug-in cameras (e.g., webcams), memory devices (e.g., flash drives), headphones, and other types of peripheral devices. For gaze-based active device identification and management functionalities, the peripherals can be configured for wireless communication via network adapters. The wireless communication can include short-range wireless protocols such as near-field communication (NFC), radio frequency identification (RFID), ZIG-BEE®, BLUETOOTH®, WI-FI®, WI-FI DIRECT®, and the like.

The GADIMS 305 includes a user device identifier 310, a peripheral device identifier 315, a reference gaze image collector 320, a current gaze image collector 325, a gaze image comparator 327, an active user device identifier 330, and a device manager 335. The functionalities of the user device identifier 310, peripheral device identifier 315, reference gaze image collector 320, current gaze image collector 325, gaze image comparator 327, active user device identifier 330, and device manager 335 can be processor-executable instructions that can be executed by a dedicated or shared processor using received inputs.

The user device identifier 310 can be configured to identify user devices 355 in an environment (e.g., a nearby vicinity, within a given area, within a given geofence, on a same wireless network, etc.) of a user. In embodiments, identified user devices can include devices that are powered on within the environment of the user (e.g., inactive or powered down devices may not be managed by the GADIMS 305). In embodiments, identified user devices can include devices that the user has interacted with within a particular time window (e.g., within the last 5 minutes, 15 minutes, hour, etc.). In embodiments, identified user devices can include devices that are manually indicated (e.g., on a graphical user interface (GUI) or other input mechanism) by the user. In embodiments, identified user devices can include devices that are connected to a same wireless network (e.g., a same router or modem). In these embodiments, the user device identifier 310 can be configured to identify the user devices based on devices indicated as connected to the same wireless network. This can include analysis of data from a wireless network or a wireless network management application. However, any other suitable manner for identifying user devices in the environment of the user to be managed by GADIMS 305 can be implemented without departing from the spirit and scope of the present disclosure.

The peripheral device identifier 315 can be configured to identify peripheral devices 340 in the environment of the user that can be utilized for gaze-based pairing. In embodiments, the peripheral devices 340 to be managed by the GADIMS 305 can be manually designated by the user. In embodiments, the peripheral devices 340 to be managed by the GADIMS 305 can include all peripheral devices paired to a particular user device 355 (e.g., a first device) or set of devices 355 (e.g., a first and second device) within the environment of the user. Any suitable number and/or type of peripheral devices can be implemented and managed by GADIMS 305. Peripheral devices can be identified in any suitable manner.

The reference gaze image collector 320 can be configured to collect reference gaze image data from the user. Collecting reference gaze image data from the user can include capturing one or more images of the user while the user is gazing at one or more respective user devices 355 in their environment at a particular time (e.g., a first time) using cameras 370. The reference gaze images are utilized as a reference for how the user appears when the user is gazing each of the respective user devices 355. For example, a first reference image can be captured by a camera of a first user device depicting how the user appears when the user is gazing at the first user device, a second reference image can be captured by a camera of a second user device depicting how the user appears when the user is gazing at the second user device, and a third reference image can be captured by a camera of a third user device depicting how the appears looks when the user is gazing at the third user device. Thus, each user device in the environment of the user can be configured to collect reference image data depicting the appearance of the user when the user is gazing at each respective user device.

Alternatively, or additionally, reference gaze images of the user can be collected when the user is looking at a different device than the device that captured the reference image. For example, a first reference image can be captured by a camera of a second user device depicting how the user appears when the user is gazing at a first user device, a second reference image can be captured by a camera of a third user device depicting how the user appears when the user is gazing at the first user device, and a third reference image can be captured by a camera of a fourth user device depicting how the user appears when the user is gazing at the first user device. Thus, the user devices can be configured to capture the user's appearance when the user is gazing at devices within the environment.

Collection of reference gaze image data by reference gaze image collector 325 can occur in response to a condition. In some embodiments, collection of reference gaze image data can be initiated in response to a manual indication by the user. In these embodiments, the user can initiate reference gaze image collection via a command (e.g., a voice command, touch command, GUI command, etc.). In some embodiments, the collection of reference gaze image data can be initiated in response to a determination that reference gaze images do not match a current gaze image of the user (to be discussed with respect to FIG. 6). In some embodiments, collection of reference image data can be initiated in response to a determination that one or more user devices 355 have been repositioned (to be discussed further with respect to FIG. 7). In embodiments, collection of reference gaze image data can be completed continuously (e.g., via live active video feeds), periodically (e.g., every minute, every 5 minutes, every hour, etc.), intermittently, or at any other suitable time interval or condition.

Reference gaze images 385 can be stored in datastore 380 and be accessible over network 350. Collecting reference gaze images 385 can be referred to as a reference gaze image collection session. The reference gaze image session can include prompting the user to gaze, iteratively, at each respective device while one or more reference gaze images 385 are collected from one or more of user devices 355. For example, a first set of reference gaze images can be captured by cameras 370 of each device 355 while a user is gazing at a first device (e.g., while the user is in a first gaze position), a second set of reference gaze images can be captured by cameras 370 of each device 355 while a user is gazing at a second device (e.g., while the user is in a second gaze position), and a third set of reference gaze images can be captured by cameras 370 of each device 355 while a user is gazing at a third device (e.g., while the user is in a third gaze position). Each respective set of gaze images (or individual gaze images within each respective set) can be used to identify the active device the user is currently gazing.

Reference gaze images 385 collected by reference gaze image collector 320 can be stored within datastore 380 for later comparison. In embodiments, the reference gaze images 385 can be stored within respective sets associated with the gaze position (e.g., the current device the user is gazing) that the user was in while the respective gaze images 385 were collected. For example, a first set of reference gaze images captured by each user device 355 while the user is in a first gaze position (e.g., gazing at a first user device) can be designated as associated with the first gaze position and be grouped accordingly.

In embodiments, upon collecting reference gaze image data, the GADIMS 305 can be configured to generate a virtual layout 387 indicating spatial locations (e.g., position and orientation) of each user device 355 in the environment of the user. The virtual layout 387 can be a digital representation of the environment of the user indicating the position/orientation of each user device 355 and/or the position/orientation of the user at the time the reference gaze images were collected. The virtual layout 387 can be stored within datastore 380. The virtual layout 387 can be rendered to the user in 2D or 3D.

The virtual layout 387 can be utilized by the user to manually indicate which user devices 355 the user desires to be managed by the GADIMS 305 and the particular manners that the user desires to manage each user device 355. For example, a GUI or other input mechanism can be implemented to allow the user to select a particular user device within the virtual layout 387. In response to selecting the particular user device on the virtual layout 387, a menu of options can be displayed allowing the user to set management preferences for the particular device. The management preferences displayed on the menu, can include, among others: an option to enable gaze-based active device identification and management (e.g., "Yes" or "No"), an option to designate particular peripheral devices 340 that will be automatically paired to the particular device based on gaze analysis (e.g., "all peripherals," "peripheral 1," "peripheral 2," "peripheral 3," "none"), an option to specify commands that can be issued to the particular device based on gaze-based active device identification (e.g., "automatic power-on," "automatically open software application X," "automatically open file X," "automatically back-up," "automatically transfer data to device Y,"), an option to specify reference gaze image collection conditions for the particular device (e.g., "periodically," "when device X is repositioned," "when reference gaze image match does not occur."), an option to specify current gaze image collection conditions for the particular device (e.g., "periodically," "when user changes position"), and an option for enabling multiple angles of image comparison (e.g., collection of multiple current gaze images for comparison to respective reference gaze images from the same perspective), among other potential options.

Further the virtual layout 387 can be utilized by the user such that the user can indicate position changes of any user devices 355. In embodiments, the virtual layout 387 may be generated to scale (e.g., using photogrammetry techniques using the reference gaze images as inputs, based on images captured from IoT devices, using volumetric video generation techniques, or other manners for generating a to-scale virtual layout 387). In response to the user repositioning a user device 355 in their environment, the user can indicate, on the virtual layout 387, the new position of the user device 355 which was repositioned. In embodiments, the virtual layout 387 can be automatically updated in response to a reposition indication via reference gaze image collection.

In embodiments, the virtual layout 387 can be used to generate an extended reality (XR) representation of the environment such that the user can manage the virtual layout 387 via an XR device (e.g., a virtual reality (VR) or augmented reality (AR) device). In these embodiments, the virtual layout 387 can be integrated into a volumetric video which can be navigated by a user using an XR device or other device. The user can then input commands, via controllers, gesture commands, voice commands, or other input mechanisms, to manage the configuration settings of the GADIMS 305 within the virtual layout 387. The modifiable configuration settings can include those discussed above.

The current gaze image collector 325 can be configured to collect a current gaze image of the user at a current time (e.g., a second time). The current gaze image can be collected by any suitable user device 355 within the environment of the user. In embodiments, the current gaze image is collected from a user device 355 that has already captured a reference gaze image such that comparison between the current gaze image and the reference gaze image can be completed.

The current gaze image can be collected at any suitable condition or timing. In embodiments, the current gaze image can be collected in response to a manual indication by the user. In embodiments, the current gaze image can be collected continuously (e.g., via a live active video feed), periodically (e.g., every minute, 5 minutes, 30 minutes, etc.), or intermittently. In embodiments, the current gaze image can be collected when a determination is made that the user has changed positions (e.g., via a camera, gyroscope, accelerometer, or other sensor). In these embodiments, positional data from a gyroscope, accelerometer, indoor positioning system (IPS) sensor, or other sensor capable of detecting positional changes of a user can be analyzed to determine whether the user has changed positions. In response to determining that the user has changed positions, a current gaze image can be collected.

The current gaze image can capture the user's appearance when the user is gazing at a particular device at the current time. The current gaze image can be compared to one or more of the reference gaze images 385 such that a user device that the user is determined to be gazing can be determined (i.e., such that an active device the user is gazing can be identified).

The gaze image comparator 327 can be configured to compare the current gaze image of the user with one or more of the reference gaze images 385 to determine which user device the user is currently gazing, if any. Comparing the current gaze image with one or more reference gaze images can include techniques for image comparison. For example, pixels of the current gaze image can be compared with pixels of the reference gaze image which the current gaze image is currently being compared to. As another example, detected features (e.g., facial features, objects, edges, corners, blobs, ridges, curves, or other image features) of the current gaze image can be compared with detected features of the reference gaze image. Image comparison can utilize one or more machine learning (ML) and/or artificial intelligence (AI) techniques. The comparison can utilize one or more techniques for image differencing.

In embodiments, pre-processing of the current gaze image and/or the reference gaze images can be completed such that adequate comparison can be completed. For example, pre-processing images for comparison can include aligning particular portions of the images, rotation of images, color-mapping, noise reduction, filtering, feature extraction, and/or other pre-processing techniques.

Comparison can be completed on a pixel-basis or feature-basis. For pixel-basis comparison, the comparison can consider the number of matched pixels and mismatched pixels. The comparison can output all pixel coordinates between the images that differ. In embodiments, for pixel-based comparison, images can be formatted into a same/similar resolution with a same/similar image center point. A match percentage threshold can be implemented for determining whether there is a match between the current gaze image and the reference gaze image. For example, a pixel match percentage threshold can be implemented indicating that if 50% or more pixels match between the current gaze image and the reference gaze image, a match is determined. However, any suitable manner for comparing the current gaze image with the reference gaze image can be completed without departing from the spirit and scope of the present disclosure. Further, any suitable pixel match percentage threshold can be implemented for gaze image comparison without departing from the spirit and scope of the present disclosure. A match between a particular reference gaze image and a current gaze image can indicate that the user device that the user is gazing as captured within the reference gaze image is the identified active user device.

For feature-based comparison, features (e.g., objects, shapes, facial features, isolated regions, continuous curves, connected regions, edges, corners, blobs, ridges, etc.) can be detected/extracted from the one or more reference gaze images and the current gaze image. Thereafter, a number/percentage of matching features between the reference gaze image(s) and the current gaze image(s) can be determined. A feature match threshold can be implemented for determining whether the current gaze image matches the reference gaze image(s). For example, if a feature match threshold is implemented requiring at least 60% of shared features between the current gaze image and the one or more reference gaze image(s) for comparison, a match can be determine if there are 60% or more shared features between the current gaze image and the reference gaze image. As discussed above, a match between a particular reference gaze image and a current gaze image can indicate that the user device that the user is gazing as captured within the reference gaze image is the identified active user device.

Various algorithms can be used for feature detection, extraction, and comparison, including, but not limited to, edge detection, corner detection, ridge detection, scale-invariant feature transform (SIFT), thresholding, template matching, Hough transform, convolutional neural networks (region-based convolutional neural networks), you only look once (YOLO), Viola-Jones, histogram of oriented gradients (HOG) features, Single Shot MultiBox Detector (SSD), Retina-Net, deformable convolutional networks, and others. Any suitable algorithm for feature detection, extraction, and/or comparison can be implemented without departing from the spirit and scope of the present disclosure.

In embodiments, multiple reference gaze images can be compared to multiple current gaze images for determining an active device the user is gazing. For example, a first reference gaze image captured by a first device can be compared with a first current gaze image captured by the first device and a second reference gaze image captured by a second device can be compared with the second current gaze image captured by the second device for determining which device the user is gazing. Considering multiple angles during gaze-based analysis can increase the accuracy of gaze detection (e.g., increase the accuracy that the correct device the user is determined). In embodiments, determining an active device that the user is gazing can consider a threshold based on multiple comparisons from multiple angles. For example, a threshold can be set such that at least 50% of angles between current gaze images and reference gaze images must match in order for a determination to be made that the user is gazing a particular device. In this example, if a match is determined between three out of four angles (e.g., a first current gaze image from a first device matches a first reference gaze image from the first device, a second current gaze image from a second device matches a second reference gaze image from the second device, a third current gaze image from a third device matches a third reference gaze image from the third device, and a fourth current gaze image from a fourth device does not match a fourth reference gaze image from the fourth device), then a determination can be made that the user is gazing at the particular device.

In embodiments, the type of gaze image comparison (e.g., pixel-based comparison vs. feature-based comparison) can be configured by the user. For example, the user can select the type of gaze image comparison they desire to implement (e.g., pixel vs. feature), threshold(s) for image match determination, pre-processing techniques to be completed prior to image comparison, and/or whether multiple angles of comparison are enabled.

Upon comparing the reference gaze image(s) 385 with the current gaze image, active user device identifier 330 can be configured to determine whether the user is gazing at a user device 355, and if so, which user device 355 the user is gazing. In embodiments, if active user device identifier 330 determines that the user is not gazing at a user device, then re-collection of reference gaze images 385 can be completed, as this may indicate that one or more user devices have been repositioned within the user's environment.

In embodiments, if active user device identifier 330 determines that the user is gazing at a particular device (e.g., an active device the user is gazing is identified), then one or more commands can be automatically issued to the particular device and/or one or more peripherals can be paired with the particular device by device manager 335. Commands that can be issued by device manager can include power-on commands, reboot commands (e.g., restart commands), launching one or more software features (e.g., files or applications), closing one or more software features, memory actions (e.g., deleting, backing-up, transferring, duplicating, or installing/storing data on the active device), and other commands/executable software functions.

Device manager 335 can also be configured to pair peripherals with the identified active user device. Pairing peripherals with the identified active user device can include short-range wireless protocols, including near-field communication (NFC), radio frequency identification (RFID), ZIG-BEE®, BLUETOOTH®, WI-FI®, WI-FI DIRECT®, and the like. Pairing can include disconnecting the peripheral from a device the user is not gazing and connecting the peripheral device to the device the user is gazing. For example, a mouse, keyboard, monitor, printer, or other peripheral can be automatically wireless paired with the identified active device.

In embodiments where a single user device has multiple displays or screens, reference gaze images 385 can be captured when the user is gazing at each display of the device. For the purposes of determining that a user is gazing at a user device with multiple displays, if a determination is made that the user is gazing at any display of the device, then a determination can be made that the user is gazing at the user device.

Upon issuing commands (e.g., executing one or more software functions) and/or pairing peripheral(s) with the user device the user is determined to be gazing by device manager 335, the GADIMS 305 can be configured to continue to monitor the environment of the user to determine whether to automatically issue commands to another device and/or pair peripherals with another device (e.g., via current gaze image collection and comparison to reference gaze images). Monitoring the gaze of the user can also continue to be completed to determine whether to re-collect reference gaze images (e.g., if one or more user devices are repositioned within the environment).

In embodiments, particular commands to issue to particular devices within the user's environment by device manager 335 can be pre-configured. That is, a user can designate, on a GUI or other input mechanism, the type of commands (e.g., power-on, launch software, update, back-up, etc.) they desire to be automatically executed in response to gaze-based active device identification. For example, for a first device, a user can indicate that a first file should be opened whenever the first device is identified as the active device via gaze analysis (e.g., reference gaze image comparison to a current gaze image). As another example, for a second device, the user can indicate that the second device should be powered-off or otherwise inactivated if the second device is in an active state (e.g., powered-on, idle, etc.) when the second device is identified as the active device via gaze analysis. As another example, a user can designate a first set of peripherals that should be paired to a third device in response to determining that the third device is identified as the active device via gaze analysis. As another example, the user can designate a second set of peripherals that should be paired to a fourth device in response to determining that the fourth device is identified as the active device via gaze analysis. Any suitable number and/or type of commands can be issued to devices within the user's environment based on gaze-based active device identification by device manager 335. Further, any suitable number and/or type of peripherals can be paired with devices within the user's environment based on gaze-based active device identification by device manager 335. The configurable settings can be modified at any suitable time by the user.

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4:
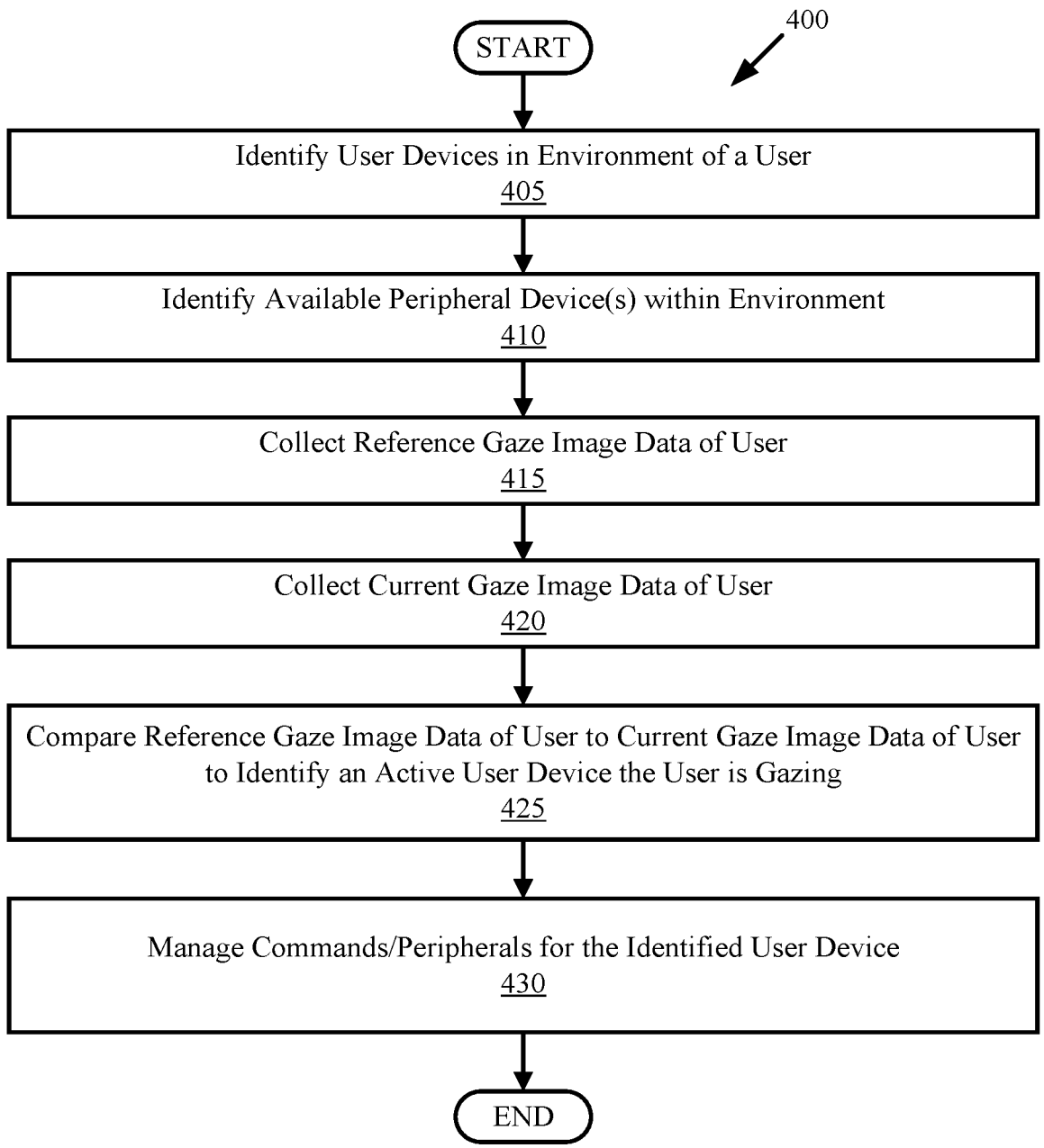
FIG. 4 is a flow-diagram illustrating an example method for gaze-based active device identification and management, in accordance with embodiments of the present disclosure.

Referring now to FIG. 4, shown is a flow-diagram of an example method 400 for gaze-based active device identification and management, in accordance with embodiments of the present disclosure. One or more operations of method 400 can be completed by one or more processing circuits (e.g., computer 101, devices 205, server 235, user devices 355, IoT devices 395, GADIMS 305, peripheral devices 340).

Method 400 initiates at operation 405, where user devices in an environment of a user are identified. The identified user devices can be enabled for gaze-based active device identification and management. Identifying user device can be completed in the same, or a substantially similar manner, as described with respect to user device identifier 310 of FIG. 3.

Peripheral devices within the environment are identified. This is illustrated at operation 410. The identified peripheral devices can be enabled for gaze-based active device identification and management. That is, the peripheral devices can be paired with one or more user devices based on gaze-analysis. Identifying peripheral devices can be completed in the same, or a substantially similar manner, as described with respect to peripheral device identifier 315 of FIG. 3

Reference gaze image data of the user is collected. This is illustrated at operation 415. Collecting reference gaze image data can include capturing, by one or more cameras of one or more respective user devices in the environment, images of the user while the user is gazing at particular devices within the environment (e.g., at a first time). Collecting reference gaze image data can be completed in the same, or a substantially similar manner, as described with respect to reference gaze image collector 320 of FIG. 3.

Current gaze image data of the user is collected. This is illustrated at operation 420. Collecting current gaze image data can include capturing, by one or more cameras of one or more respective user devices in the environment, images of the user at a current time (e.g., a second time) while the user is gazing at a particular device within the environment. Collecting current gaze images can be completed in the same, or a substantially similar manner, as described with respect to current gaze image collector 325 of FIG. 3.

The reference gaze image data (e.g., one or more reference gaze images) is compared to the current gaze image data (e.g., one or more current gaze images) to identify an active user device the user is gazing. This is illustrated at operation 425. Comparison between reference gaze images and current gaze images can be completed in the same, or a substantially similar manner, as described with respect to gaze image comparator 327 and the active user device identifier 330 of FIG. 3. For example, gaze image comparison can include pixel-based and/or feature-based comparison.

Commands and/or peripherals can then be managed for the identified user device. This is illustrated at operation 430. For example, one or more commands can be issued to the identified active user device and/or one or more peripherals can be paired with or disconnected from the identified active user device. Management of commands and/or peripherals for the identified active user device can be completed in the same, or a substantially similar manner, as described with respect to the device manager 335 of FIG. 3.

The aforementioned operations can be completed in any order and are not limited to those described. Additionally, some, all, or none of the aforementioned operations can be completed, while still remaining within the spirit and scope of the present disclosure.

Figure 5:
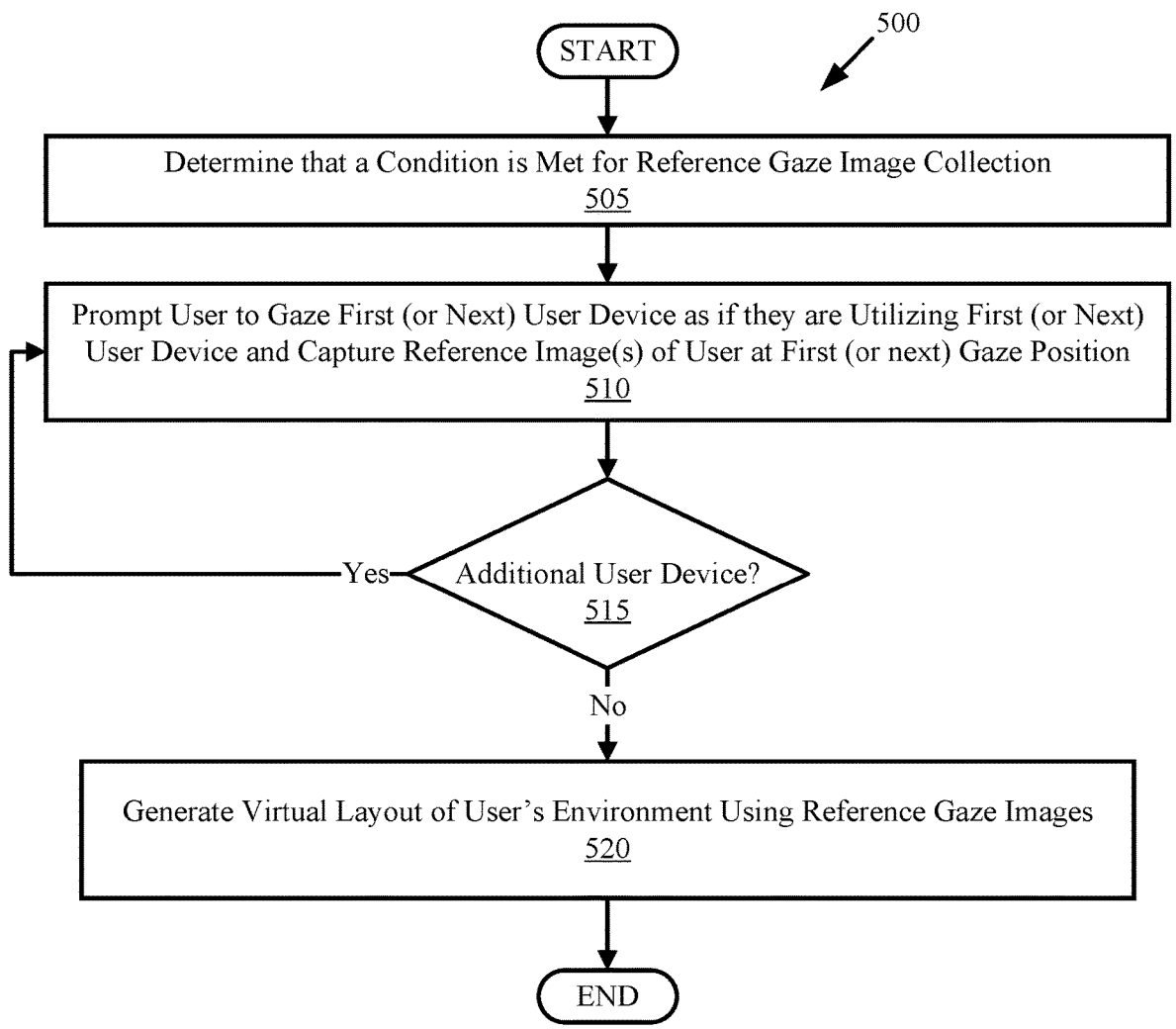
FIG. 5 is a flow-diagram illustrating an example method for reference gaze image collection and virtual layout generation, in accordance with embodiments of the present disclosure.

Referring now to FIG. 5, shown is a flow-diagram of an example method 500 for generating a virtual representation of a user's environment based on collected reference gaze image data, in accordance with embodiments of the present disclosure. One or more operations of method 500 can be completed by one or more processing circuits (e.g., computer 101, devices 205, server 235, user devices 355, IoT devices 395, GADIMS 305, peripheral devices 340).

Method 500 initiates at operation 505, where a determination is made that a condition is met for reference gaze image collection. This is illustrated at operation 505. Conditions for determining whether to collect reference gaze images can be the same as, or substantially similar to, conditions/timings described with respect to FIGS. 2-3. For example, conditions for reference gaze image collection are described with respect to FIGS. 6-7.

The user is prompted to gaze a first user device as if they are utilizing the first user device and reference gaze images are captured of the user while they are gazing at the first user device in a first gaze position. This is illustrated at operation 510. This can include capturing, by respective cameras of one or more devices within the environment of the user, images of the user while they are gazing at the first device (e.g., in the first gaze position).

A determination is made whether there are additional user devices. This is illustrated at operation 515. If there are additional user devices, the user is prompted to gaze a next user device as if they are utilizing the next user device and reference gaze images are captured of the user while they are gazing at the next user device in a next gaze position. This can be completed iteratively for all user devices in the user's environment for which gaze-based active device identification and management is enabled.

A virtual layout of the user's environment is then generated using the reference gaze images. This is illustrated at operation 520. The virtual layout can be the same as, or substantially similar to, virtual layout 387 of FIG. 3. The virtual layout can be used for managing functionalities of the gaze-based active device identification and management system by the user, described with respect to FIG. 3. The virtual layout can also be used for indicating repositioning of devices by the user, described with respect to FIG. 3.

The aforementioned operations can be completed in any order and are not limited to those described. Additionally, some, all, or none of the aforementioned operations can be completed, while still remaining within the spirit and scope of the present disclosure.

Figure 6:
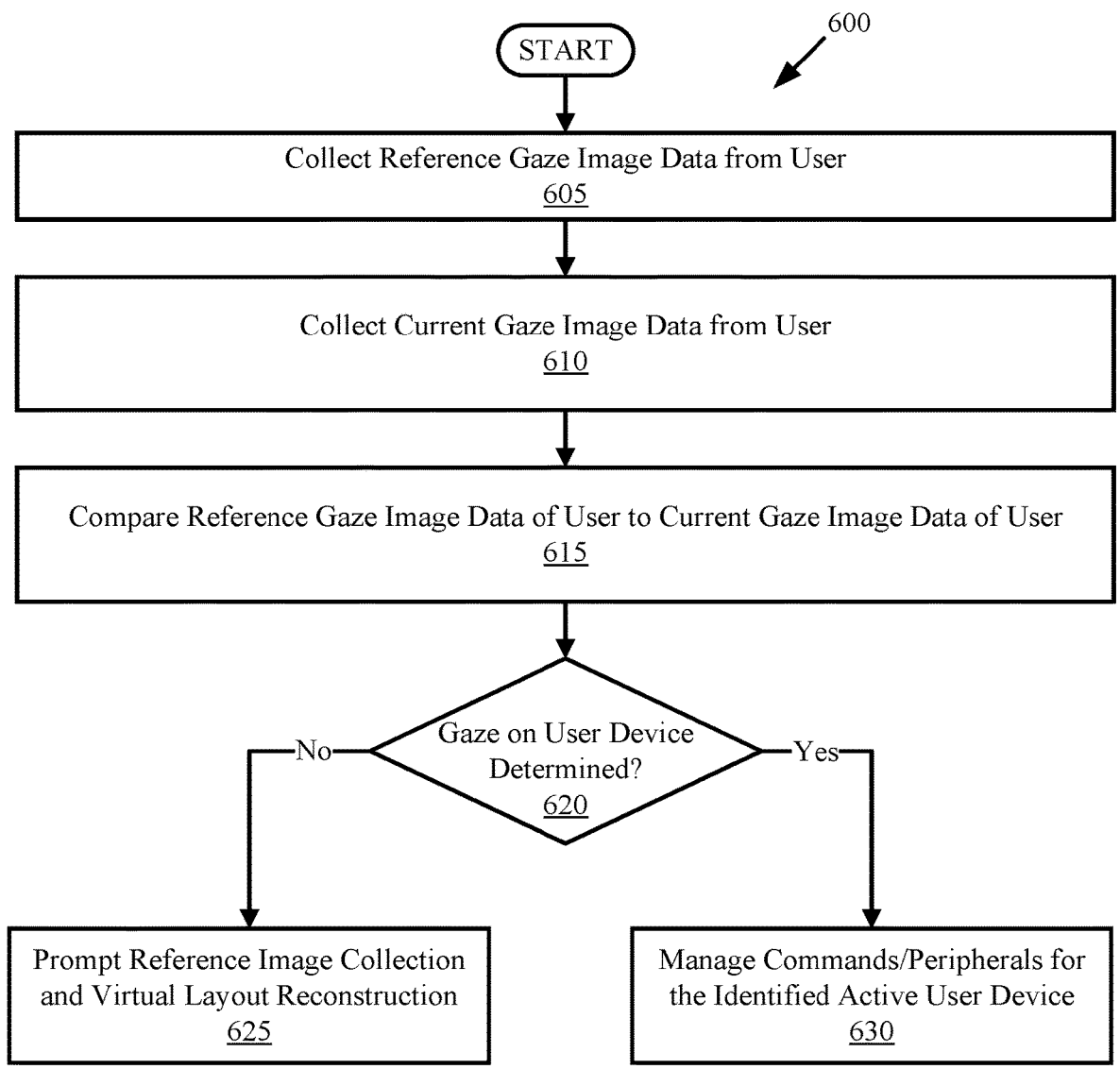
FIG. 6 is a flow-diagram illustrating an example method for determining whether to prompt reference gaze image collection and virtual layout reconstruction, in accordance with embodiments of the present disclosure.

Referring now to FIG. 6, shown is a flow-diagram of an example method 600 for determining whether to prompt reference image collection and virtual layout reconstruction, in accordance with embodiments of the present disclosure. One or more operations of method 600 can be completed by one or more processing circuits (e.g., computer 101, devices 205, server 235, user devices 355, IoT devices 395, GADIMS 305, peripheral devices 340).

Method 600 initiates at operation 605, where reference gaze image data is collected from the user. Current gaze image data is then collected from the user. This is illustrated at operation 610. The reference gaze image data is then compared to the current gaze image data. This is illustrated at operation 615. A determination is made whether a gaze on a user device is determined (e.g., whether an active device the user is gazing is identified). This is illustrated at operation 620.

If a determination is made that the user is gazing at a user device in their environment, then command and/or peripherals can be managed for the identified active user device. This is illustrated at operation 630. Operation 630 can be completed in the same, or a substantially similar manner, as operation 430 of FIG. 4.

If a determination is made that a user is not gazing at a user device in their environment (e.g., no match is found between current gaze image(s) and reference gaze image(s)), then the user is prompted for reference image collection and virtual layout reconstruction. This is illustrated at operation 625. Because the user is not found to be gazing at any device in their environment, this may imply that the user has repositioned a user device in their vicinity. Thus, reference images can be re-collected such that the updated position of user devices in the environment are accounted for. Further, the virtual layout can be reconstructed to reflect the updated positions of the user devices.

The aforementioned operations can be completed in any order and are not limited to those described. Additionally, some, all, or none of the aforementioned operations can be completed, while still remaining within the spirit and scope of the present disclosure.

Figure 7:
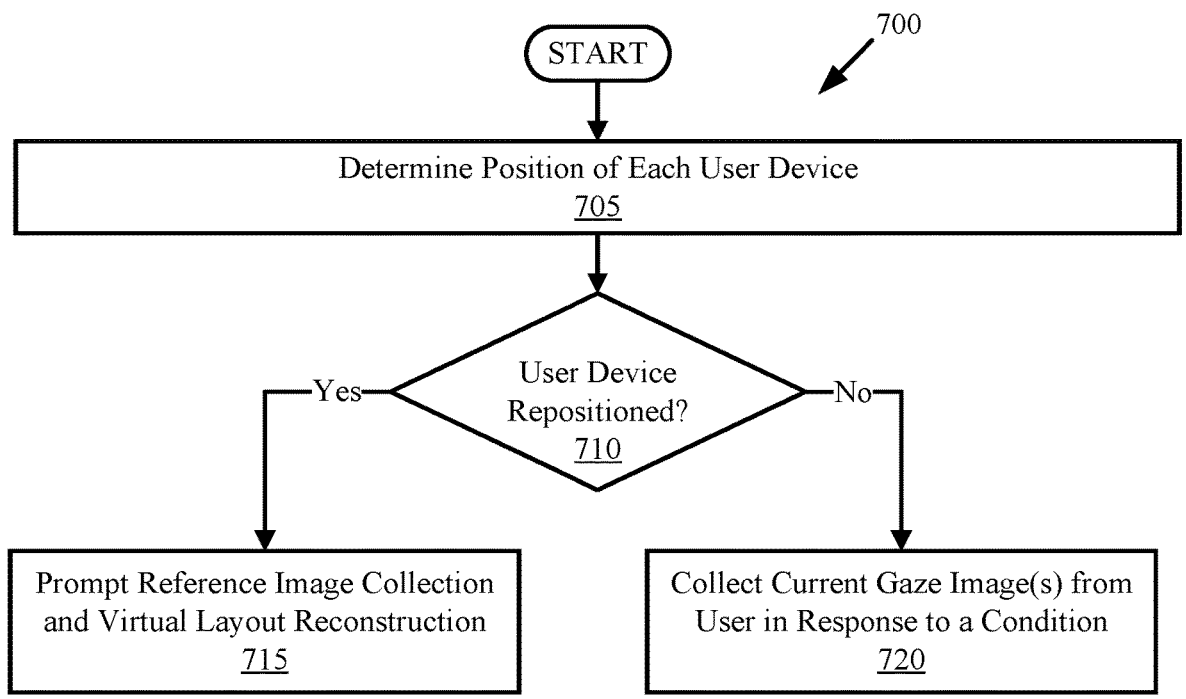
FIG. 7 is a flow-diagram illustrating another example method for determining whether to prompt reference gaze image collection and virtual layout reconstruction, in accordance with embodiments of the present disclosure.

Referring now to FIG. 7, shown is a flow-diagram of another example method 700 for determining whether to prompt reference image collection and virtual layout reconstruction, in accordance with embodiments of the present disclosure. One or more operations of method 700 can be completed by one or more processing circuits (e.g., computer 101, devices 205, server 235, user devices 355, IoT devices 395, GADIMS 305, peripheral devices 340).

Method 700 initiates at operation 705, where a position of each user device in an environment of a user is determined. Determining the position of each device in the environment of the user can be completed in any suitable manner. In some embodiments, a user can manually indicate a position of each user device (e.g., using virtual layout 387). In some embodiments, the position of each device can be determined via a global positioning system (GPS). In some embodiments, the position of each device can be determined by an indoor positioning system (IPS). Any suitable IPS technology can be implemented, including, but not limited to, optical-based positioning, radio wave-based positioning, magnetic field-based positioning, acoustic-signal based positioning, and/or behavioral-based positioning. The IPS can utilize short range wireless technologies such as Wi-Fi® and Bluetooth®. Analysis can include choke points, grids, angle of arrival, time of arrival, received signal strength indication (RSSI), and others.

A determination is made whether a user device has been repositioned. This is illustrated at operation 710. Determining whether a user device has been repositioned can include comparison of a current position of each user device to a recorded position (e.g., the positions recorded at operation 705) of each user device to determine whether any positions have changed. In some embodiments, a user can manually indicate that a device has been repositioned (e.g., via a command input through virtual layout 387).

If a determination is made that a user device has been repositioned, then the user is prompted for reference image collection and virtual layout reconstruction. This is illustrated at operation 715. Because the user device has been repositioned, current reference gaze images may not account for the updated position which could lead to inaccurate active device identification. Thus, reference images can be re-collected such that the updated position of user devices in the environment are accounted for. Further, the virtual layout can be reconstructed to reflect the updated positions of the user devices.

If a determination is made that the user device has not been repositioned, then current gaze image(s) can be collected from the user in response to a condition. This is illustrated at operation 720. Collection current gaze images from the user in response to a condition can be completed in the same, or a substantially similar manner, as described with respect to current gaze image collector 325 of FIG. 3.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:
    collecting a plurality of reference gaze images of a user while the user is gazing, at a first time, at a first user device of a plurality of user devices in an environment of the user, wherein respective collected reference gaze images are captured from a different user device of the plurality of user devices while the user is gazing at the first user device;
    collecting a plurality of current gaze images of the user at a second time, wherein respective collected current gaze images are captured from respective different user devices that captured a reference gaze image of the user at the first time; and
    comparing respective reference gaze images with the respective current gaze images to determine that the user is gazing at the first user device of the plurality of user devices.

2. The method of claim 1, further comprising:
    pairing, in response to determining that the user is gazing at the first user device of the plurality of user devices, at least one peripheral device to the first user device.

3. The method of claim 1, wherein the plurality of reference gaze images collected from different user devices of the plurality of user devices are used to generate a virtual layout of the environment of the user, wherein the virtual layout indicates a position and an orientation of each user device of the plurality of user devices that captured a reference gaze image of the user at the first time.

4. The method of claim 3, wherein the virtual layout includes a graphical user interface (GUI) with a plurality of configurable options for gaze-based active device identification and management.

5. The method of claim 4 wherein the plurality of configurable options include a first option to enable or disable specific user devices of the plurality of devices for gaze-based active device identification management and a second option to set peripheral pairing preferences for each user device of the plurality of user devices.

6. The method of claim 4, wherein the plurality of configurable options include a first option to set reference gaze image collection conditions and a second option to set current gaze image collection conditions.

7. The method of claim 1, wherein prior to collecting of the plurality of reference gaze images, a determination is made whether a condition is met for reference gaze image collection.

8. The method of claim 7, wherein the condition includes a determination that at least one user device of the plurality of user devices has been repositioned.

9. The method of claim 1, further comprising:
    automatically issuing a command to the first user device in response to determining that the user is gazing at the first user device of the plurality of user devices.

10. The method of claim 9, wherein the command is a power-on command.

11. The method of claim 1, wherein the comparing includes comparing pixels of respective reference gaze images to pixels of respective current gaze images to determine a percentage of matching pixels for each respective comparison.

12. The method of claim 11, wherein a percentage of matching pixels of a respective comparison is compared to a threshold to determine that the user is gazing at the first user device of the plurality of user devices.

13. A system comprising:
    one or more processors; and
    one or more computer-readable storage media collectively storing program instructions which, when executed by the one or more processors, are configured to cause the one or more processors to perform a method comprising:
    collecting a plurality of reference gaze images of a user while the user is gazing, at a first time, at a first user device of a plurality of user devices in an environment of the user, wherein respective collected reference gaze images are captured from a different user device of the plurality of user devices while the user is gazing at the first user device;
    collecting a plurality of current gaze images of the user at a second time, wherein respective collected current gaze images are captured from respective different user devices that captured a reference gaze image of the user at the first time; and comparing respective reference gaze images with the respective current gaze images to determine that the user is gazing at the first user device of the plurality of user devices.

14. The system of claim 13, wherein the program instructions include additional instructions configured to cause the one or more processors perform the method further comprising:

pairing, in response to determining that the user is gazing at the first user device of the plurality of user devices, at least one peripheral device to the first user device.

15. The system of claim 13, wherein the program instructions include additional instructions configured to cause the one or more processors perform the method further comprising:

automatically issuing a command to the first user device to open a first application or file in response to determining that the user is gazing at the first user device of the plurality of user devices.

16. The system of claim 13, wherein the comparing includes comparing detected features within respective reference gaze images to detected features within respective current gaze images to determine a number of matching features for each respective comparison, wherein a number of matching features of a first respective comparison is compared to a threshold to determine that the user is gazing at the first user device of the plurality of user devices.

17. A computer program product comprising one or more computer readable storage media, and program instructions collectively stored on the one or more computer readable storage media, the program instructions comprising instructions configured to cause one or more processors to perform a method comprising:

collecting a plurality of reference gaze images of a user while the user is gazing, at a first time, at a first user device of a plurality of user devices in an environment of the user, wherein respective collected reference gaze images are captured from a different user device of the plurality of user devices while the user is gazing at the first user device;

collecting a plurality of current gaze images of the user at a second time, wherein respective collected current gaze images are captured from respective different user devices that captured a reference gaze image of the user at the first time; and comparing respective reference gaze images with the respective current gaze images to determine that the user is gazing at the first user device of the plurality of user devices.

18. The computer program product of claim 17, wherein the program instructions include additional instructions configured to cause the one or more processors perform the method further comprising:

pairing, in response to determining that the user is gazing at the first user device of the plurality of user devices, at least one peripheral device to the first user device.

19. The computer program product of claim 17, wherein the program instructions include additional instructions configured to cause the one or more processors perform the method further comprising:

automatically issuing a command to the first user device to execute a memory action in response to determining that the user is gazing at the first user device of the plurality of user devices.

20. The computer program product of claim 17, wherein the plurality of reference gaze images collected from different user devices of the plurality of user devices are used to generate a virtual layout of the environment of the user, wherein the virtual layout indicates a position and an orientation of each user device of the plurality of user devices that captured a reference gaze image of the user at the first time.

* * * * *